United States Patent [19]

Pourtau et al.

[11] Patent Number: 4,723,332

[45] Date of Patent: Feb. 9, 1988

[54] MULTI-PURPOSE TOOL, SUITABLE IN PARTICULAR FOR DRILLING AND CUTTING

[75] Inventors: Jean-Jacques Pourtau, Croissy S/Seine; Able Thiriet, Dole, both of France

[73] Assignee: Societe Anonyme: Tomecanic S.A., Aubergenville, France

[21] Appl. No.: 843,772

[22] Filed: Mar. 25, 1986

[30] Foreign Application Priority Data

Mar. 27, 1985 [FR] France .................. 85 04563

[51] Int. Cl.⁴ .................. B25F 1/00; B27B 21/00
[52] U.S. Cl. .................. 7/149; 30/123; 408/20
[58] Field of Search .................. 408/22, 20; 30/166 R, 30/507, 144, 122, 123; 7/149, 148

[56] References Cited

U.S. PATENT DOCUMENTS

| | | | |
|---|---|---|---|
| 210,421 | 12/1878 | Griffin | 30/507 X |
| 998,660 | 7/1911 | Vlchek | 408/20 |
| 2,142,750 | 1/1939 | Hallikas . | |
| 2,560,846 | 7/1951 | Caster | 7/149 |
| 2,769,469 | 11/1956 | Budniak . | |
| 3,038,177 | 6/1962 | Mächtle | 7/149 |

FOREIGN PATENT DOCUMENTS

| | | | |
|---|---|---|---|
| 506839 | 12/1976 | Australia . | |
| 420016 | 1/1911 | France | 7/149 |
| 828646 | 5/1938 | France . | |
| 90360 | 8/1921 | Switzerland . | |

Primary Examiner—Z. R. Bilinsky
Attorney, Agent, or Firm—Brumbaugh, Graves, Donohue & Raymond

[57] ABSTRACT

The invention relates to a multi-purpose tool constituted by a U-shaped frame with two branches joined together by a bar, one branch being extended by an appendix parallel to the bar and equipped at its end with a drilling tool, by a handle assembly extending from the end of the second branch in parallel to the bar and comprising a handle adapted to be either integral with the frame or mounted for rotating thereon, and by an elongated cutting tool with two ends fastenable on the ends of the two branches of the U-shape.

The handle comprises a rod of which one threaded end is provided with a shoulder, whereas close to its end, the second branch of the U-shape is provided with a hole traversed by the threaded end of the rod until it contacts the shoulder part, a nut being provided to optionally hold said rod in position on the frame and to selectively immobilize it thereon.

The invention finds an application as a tool for drilling an cutting earthenware tiles.

3 Claims, 3 Drawing Figures

MULTI-PURPOSE TOOL, SUITABLE IN PARTICULAR FOR DRILLING AND CUTTING

The present invention relates to a multi-purpose tool suitable in particular for drilling and cutting.

Known types of small multi-purpose tools are used on worksites for drilling panels of earthenware, baked clay or ceramics, and for cutting out pieces from that drilled hole.

There is for example a multi-purpose tool, which can, first of all, drill a hole in a panel, and then cut a part from said panel, from the perforated hole, said tool being constituted to this effect of:

a U-shaped frame with two branches joined together by a connecting bar, one branch being extended outwardly by an appendix, parallel to said connecting bar and provided at its end with a drilling tool;

a handle assembly, extending outwardly, from the end of the second branch of the U-frame, and parallely to the base of the U, said assembly comprising a handle adapted to be selectively, either part of the frame, or pivotally mounted thereon parallely to the bar of the U, via a screw-type locking device; and an elongated cutting tool, such as a saw blade, with two ends provided with holes so as to be removably fixed on the ends of the two branches of the U-frame.

This type of tool has been found to be very satifactory, its only disadvantage being that its very elaborate industrial production leads to a rather high cost price.

It is the object of the present invention to propose a tool working on the same principle, but of simpler construction, so as to manufacture it at competitive prices while preserving all the advantages of the known tool.

According to the invention, the handle assembly comprises a straight rod separate from the frame, of which one end is threaded, on the one hand, and provided, on the other hand, with a shoulder part, whereas close to its end, the second branch of the U-frame is provided with a through-hole which the threaded end of the rod can traverse in order to bring said shoulder part in contact with the second branch of the U-frame, and whereas a nut, of preferably butterfly type, may be screwed on said threaded end of the rod in order to hold said rod in position on the frame and, selectively, lock it thereon.

The following advantageous dispositions are also preferably adopted:

a portion of the end of the rod, which extends between the shoulder part and the threaded part of said end, is smooth;

substantially in the area of the ends of the branches of the U-frame, are fixed two studs, which studs are situated in a plane perpendicular to the plane of the U-shape, and substantially parallel to the bar of said U-shape, said studs being divergent by extending away from said branches of the U-shape, the distance between them, in the configuration where the cutting tool is dismounted from the frame, being greater than the distance between the two holes for fixing the cutting tool, the U-shape of the frame being also resilient, so as to permit by elastic deformation, mounting of the holes on the studs.

The invention will be more readily understood on reading the following description with reference to the accompanying drawings in which.

Figure 1:
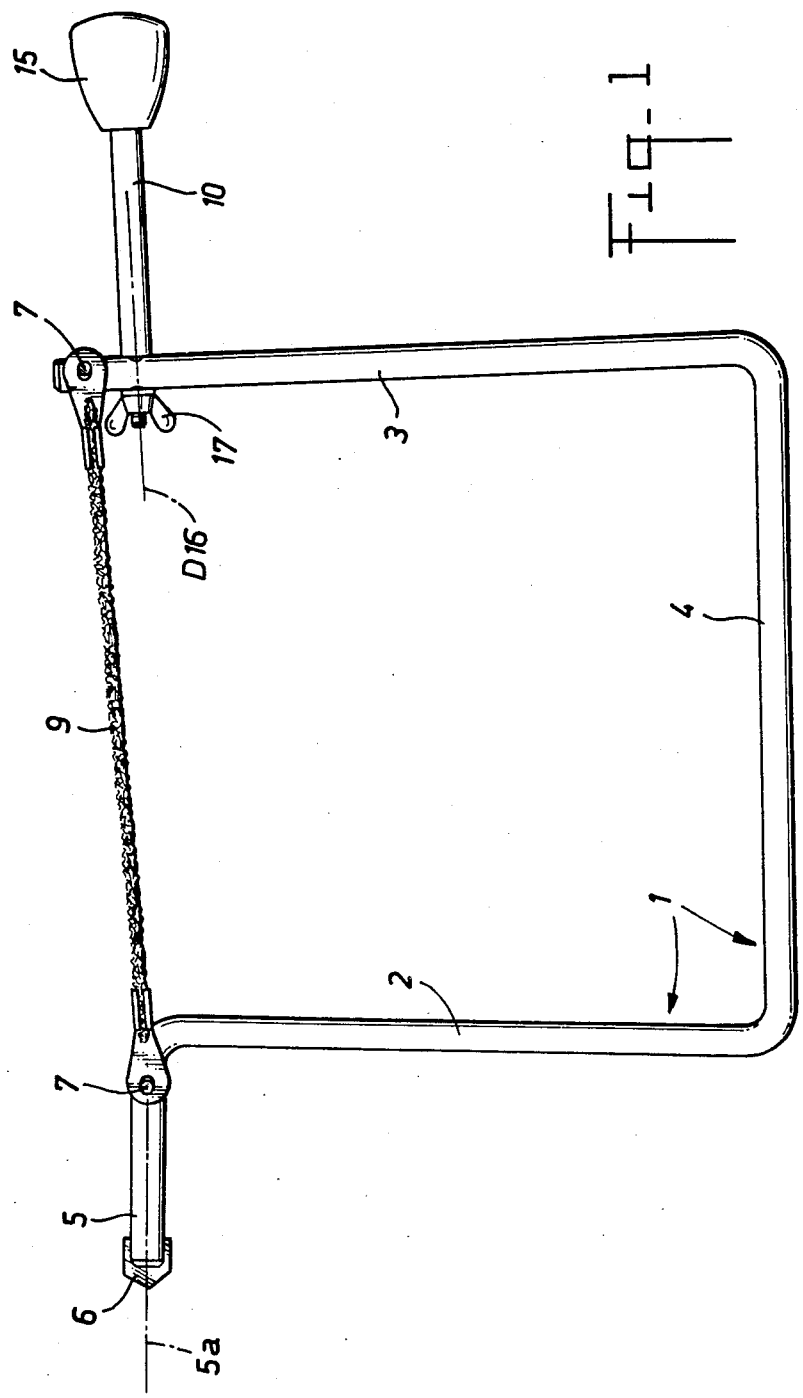
FIG. 1 is an elevational view of a multi-purpose tool according to the invention, in "mounted", ready-to-use configuration.
Figure 2:
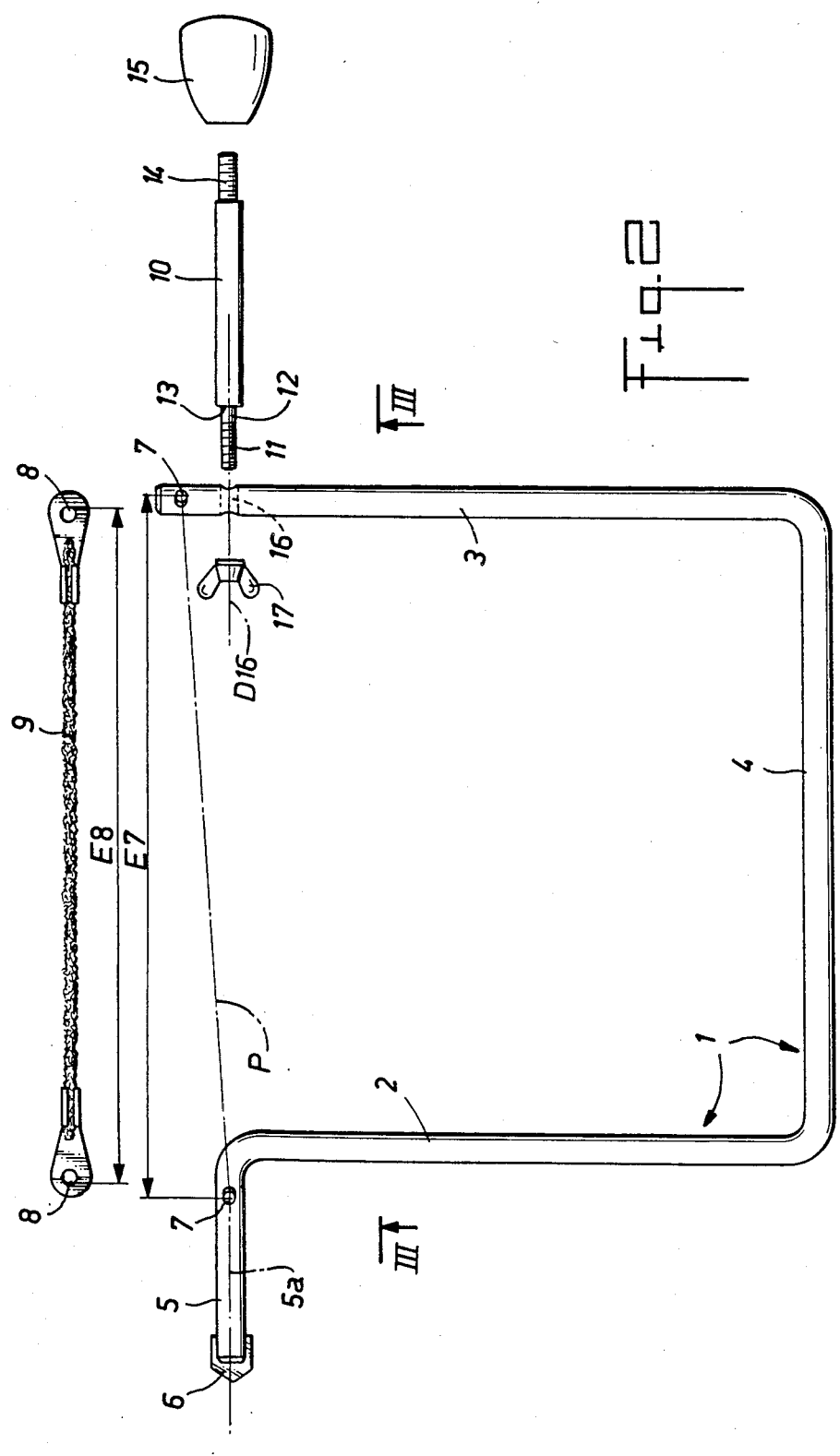
FIG. 2 is a view from the tool according to FIG. 1, in "dismounted" configuration.
Figure 3:
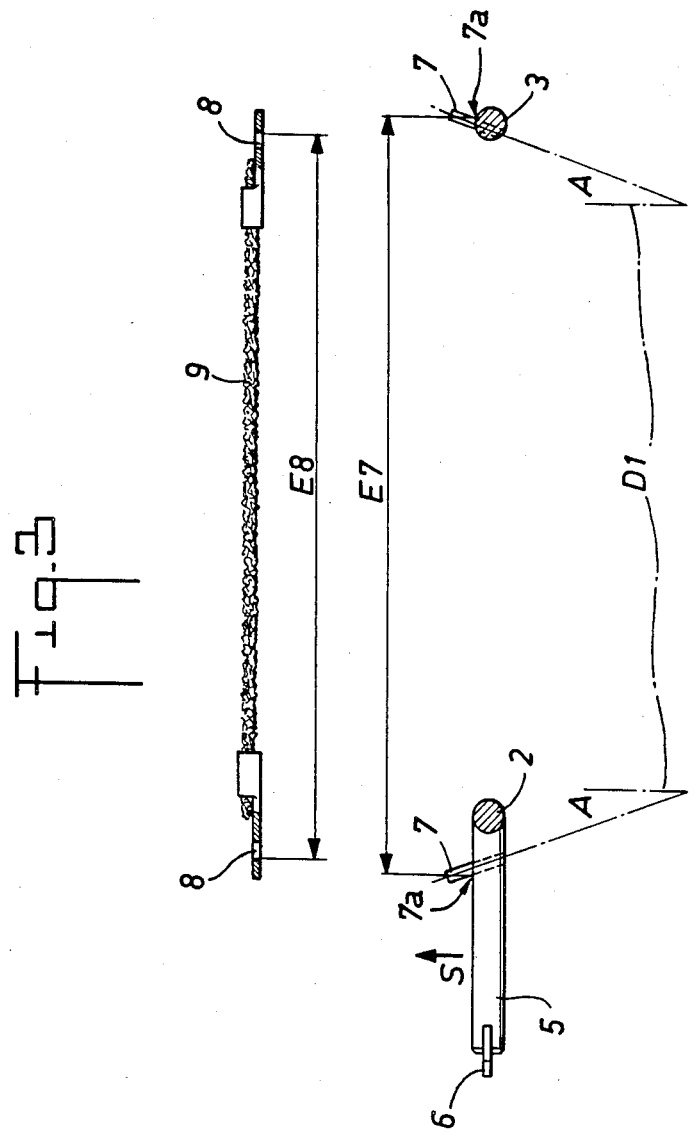
FIG. 3 is a cross-section along line III—III of FIG. 2.

The multi-purpose tool illustrated in the figures is constituted by:

a frame 1 of general U-shape, with a first branch 2 and a second branch 3 which, in the illustrated example, are parallel and joined together by a connecting bar 4 substantially perpendicular to said branches 2 and 3, the said frame being produced from an elbow-bent bar of circular cross-section;

an appendix 5, constituting an extension of the first branch 2, extending in parallel to the connecting bar 4, outwardly from the U-shape, and equipped on its free end with a drilling point 6;

two studs, which are situated one close to the elbow-bent part joining the appendix 5 to the first branch 2, and the other, close to the end of the second branch 3; which are contained in a plane P perpendicular to the plane of the U-shape (namely to the plane of FIG. 2) and substantially parallel to the connecting bar 4; which form an angle A with the direction D1 perpendicular to the plane of the frame 1, by diverging one from the other at an angle 2A in the direction S of extension of branches 2 and 3; the distance E7 between said studs, measured at the base of faces 7a of the two studs farthest one from the other and of their junction with appendix 5 and branch 3, respectively, being greater, when there is no tool mounted on the ends of branches 2 and 3 (FIGS. 2 and 3) than the maximum distance E8 between the holes 8 provided for fitting a tool 9 on frame 1;

a straight rod 10, of which one end is provided, first with a thread 11, then with a plain bearing 12 axially defined by a shoulder part 13, while the other end comprises a thread 14 for screwing on a handle 15;

a through hole 16, traversing the end of the second branch of the U-shape in a direction D16 parallel to the connecting bar 4 of said U-shape;

a butterfly nut 17 screwable on the thread 11 of the rod 10, in particular when the corresponding end of said rod 10 passes through the hole 16 (FIG. 1) while the plain bearing 12 rests on the walls defining the inside of said hole 16.

The following dispositions are to be noted:

the U-frame is of course, rigid, but the ends of its branches 2 and 3, hence the studs 7 that they carry, can be brought closer together by elastic deformation of the frame, so as to enable the introduction of said studs 7 in the holes 8 of the tool 9;

said tool 9 is, in the illustrated example, constituted by a filiform saw;

the rod 10 can either be held in position only on the end of the second branch 3, the butterfly nut not locking it in position, and said rod being then freely pivotable about the axis of the hole 17 (direction D16), or it can be entirely immobilized with respect to said second branch 3 by the butterfly nut 17, then tightly screwed on said second branch 3.

The above-described multi-purpose tool is easy to operate.

To cut a part in the middle of a panel, such as a tile of earthenware for example, the user fits the rod 10 on the second branch 3 in such a way as to allow its free rotation about the axis of the hole 16. The saw 9 not being yet fitted, and the axis of the hole 16 coinciding substantially with the axis of appendix 5, the frame constitutes a crank and permits, by rotation about axis 5a of the appendix 5, the drilling of a hole inside the part to be cut out of the panel.

The hole being drilled, to allow the passage of the filiform saw 9, said saw is then introduced therein and by elastic deformation, the ends of branches 2 and 3 are brought closer together until the studs 7 can be inserted into the holes 8 of the saw 9. The simple fact of releasing the ends of the branches of the frame, is sufficient, considering the implantation of the studs 7, to achieve mounting of the saw 9 on the frame 1. The user, by tightening the butterfly nut 17, locks the rod 10 and the handle 15 with respect to the frame 1, and has then the equivalent of a conventional saw, suitable for carrying out the desired cutting.

One particular fact to be noted about the invention is the simplicity of the design, whereby, on the one hand, mounting of the saw on the frame is achieved without having to use any expensive or removable elements (such as screws or nuts) with the added risk of losing them, and on the other hand, the handle is simple, although entirely removable, and requires no special groove to be made in any support connected to the frame, it is mounted solely by way of a simple hole made in the end part of the second branch 3.

The invention is in no way limited to the description given hereinabove and on the contrary covers any variants that can be brought thereto without departing from its scope or its spirit.

What is claimed is:

1. A multi-purpose tool for, successively, drilling a hole in a panel and cutting a piece off the panel beginning from the hole, comprising:

a single piece generally U-shaped frame having first and second parallel branches jointed together by a connecting branch which is provided so as to extend in a direction generally perpendicular to said parallel branches, said first branch having an integral appendix at its free end provided so as to extend away from said first and second branches, said appendix being integral with said first branch, parallel to said connecting branch and having a free end provided with a drilling tool, said second branch having a free end in the vicinity of which a through hole is provided having an axis substantially parallel to said connecting branch;

an elongated cutting tool having two ends, each of said ends being provided with a mounting hole;

securing means provided on said free end of both said first and second branches for removable fixing said elongated cutting tool via said mounting holes;

a handle separate from said U-shaped frame and made up of a straight rod having a threaded first end and a shoulder near a point along said rod where the threads from said first end terminate, said threaded first end being insertable into said through hole of said second branch to a point where said shoulder contacts said second branch so that said handle is substantially parallel to said connecting branch and extends away from said first and second branches; and a nut provided so as to cooperate with said threaded first end of said handle so that said handle is securable on said frame in a first position so as to be rotatable about said axis of said through hole in said second branch, thereby facilitating rotation of said frame during a drilling operation utilizing said drilling tool, and fixedly securable to said frame in a second position so as not to be rotatable, thereby facilitating a cutting operation utilizing said cutting tool.

2. A tool as defined in claim 1, wherein said straight rod has a smooth portion provided between said shoulder and said termination point of the threads so as to form a rotation bearing for said rod with respect to said frame.

3. A tool as defined in claim 1, wherein said securing means incudes two studs, one of said studs being provided on said free end of both said first and second branches so as to be nearly perpendicular to a plane in which said first and second branches and said connecting branch lie, said studs being divergent from one another in the direction of said handle and said appendix, respectively, and having a distance therebetween when said cutting tool is not mounted which is greater than a distance between said mounting holes in said cutting tool, said frame being elastically deformable so as to permit said mounting holes of said cutting tool to fit over said studs.

* * * * *